(12) United States Patent
Jagow

(10) Patent No.: US 7,497,269 B2
(45) Date of Patent: Mar. 3, 2009

(54) FOLDING TRANSPORT SYSTEM WITH WING LOCK FOR AN IMPLEMENT

(75) Inventor: Scot Jagow, St. Brieux (CA)

(73) Assignee: Bourgault Industries Ltd., Saskatchewan (CA)

(*) Notice: Subject to any disclaimer, the term of this patent is extended or adjusted under 35 U.S.C. 154(b) by 593 days.

(21) Appl. No.: 11/246,941

(22) Filed: Oct. 7, 2005

(65) Prior Publication Data
US 2007/0079976 A1    Apr. 12, 2007

(51) Int. Cl.
*A01B 49/00*    (2006.01)
(52) U.S. Cl. .................... 172/311; 172/456
(58) Field of Classification Search ............ 172/310, 172/311, 456, 466, 662
See application file for complete search history.

(56) References Cited

U.S. PATENT DOCUMENTS

| | | | | |
|---|---|---|---|---|
| 3,321,028 A | * | 5/1967 | Groenke | 172/311 |
| 3,797,580 A | * | 3/1974 | Roth | 172/311 |
| 3,844,358 A | * | 10/1974 | Shuler et al. | 172/311 |
| 4,023,623 A | * | 5/1977 | Anderson | 172/311 |
| 4,133,391 A | * | 1/1979 | Richardson et al. | 172/311 |
| 4,191,260 A | * | 3/1980 | Klindworth | 172/311 |
| 4,204,575 A | * | 5/1980 | Richardson et al. | 172/1 |
| 4,206,816 A | * | 6/1980 | Richardson et al. | 172/311 |
| 4,400,994 A | * | 8/1983 | Skjaeveland | 74/520 |
| 4,529,040 A | * | 7/1985 | Grollimund | 172/311 |
| 4,619,330 A | * | 10/1986 | Machnee | 172/311 |
| 5,921,325 A | * | 7/1999 | Meek et al. | 172/311 |
| 6,003,615 A | * | 12/1999 | Moore | 172/456 |
| 6,089,329 A | | 7/2000 | Smith | |
| 6,092,609 A | | 7/2000 | Jeffery et al. | |
| 6,220,366 B1 | | 4/2001 | Noonan et al. | |
| 6,684,962 B1 | | 2/2004 | Lewallen | |
| 6,761,228 B2 | | 7/2004 | Dobson et al. | |

* cited by examiner

*Primary Examiner*—Thomas B Will
*Assistant Examiner*—Joel F Mitchell
(74) *Attorney, Agent, or Firm*—Frost Brown Todd LLC

(57) ABSTRACT

An agricultural implement apparatus comprises a center section, inner foldable wings, outer foldable wings, and foldable wing extensions oriented substantially horizontally when in the field position. When in the transport position, the center section is horizontal, the inner wings extend vertically from ends of the center section, the outer wings extend downward and inward from upper ends of the inner wings such that lower ends of the outer wings are adjacent to each other, and the wing extensions extend downward and outward from the lower ends of the outer wings toward corresponding ends of the center section. A wing locking and folding apparatus includes an over-centering locking mechanism, and maintains an implement wing extension in alignment with an implement wing when in a field position, and folds the wing extension upward to a transport position.

9 Claims, 10 Drawing Sheets

FOLDING TRANSPORT SYSTEM WITH WING LOCK FOR AN IMPLEMENT

This invention is in the field of agricultural implements and in particular systems for folding such implements for transport.

BACKGROUND OF THE INVENTION

As farm sizes have increased over the years, agricultural implements have necessarily increased in size as well. Wider implements have been generally preferred as being more efficient for covering the increased areas, as opposed to using a plurality of smaller implements. Each implement also requires a relatively skilled operator, and same are not readily available in the sparsely populated rural areas.

Modern farms also typically include land that is scattered over a considerable area, requiring that implements be transported from one field to the next on public roads. In order to do so safely while allowing other traffic to pass, and in order move under overhead utility lines, it is generally considered that an implement in transport position should be no more than about 25 to 26 feet wide, and about 18 to 19 feet high.

In order to achieve this folded transport size in conventional implements comprising a center section and wing sections that fold vertically above the center section, implement size has been limited to about 64 feet. One typical configuration for folding a five section implement for transport is illustrated in U.S. Pat. No. 6,220,366 to Noonan et al. and U.S. Pat. No. 6,089,329 to Smith. The implement comprises a center section, an inner wing pivotally attached to each side of the center section, and an outer wing pivotally attached to outer ends of the inner wings. The outer wings are folded over to lie substantially flat above the inner wings, and then the inner wings are raised to an upright orientation such that the outer wings extend downward from the ends of the inner wings and between the inner wings. The inner wings in the Noonan implement are oriented substantially vertical, while those in the Smith implement lean somewhat inwards.

U.S. Pat. No. 6,092,609 to Jeffrey et al. illustrates an alternate configuration for folding a five section implement for transport where the outer wings are folded substantially vertical to the ends of the inner wings, and the inner wings are raised to a substantially vertical orientation with the outer wings oriented substantially horizontally and aligned end-to end.

The above implements provide 5 separate independent sections when working in the field. Each inner wing can pivot up and down with respect to the center section, and each outer wing can pivot up and down with respect to each inner wing. Such flexibility improves the ability of the implement to flex and follow ground contours to better maintain an even depth for the ground engaging tools typically mounted on the implement.

Such flexibility is not always required or provided, as for example in the implements illustrated in U.S. Pat. No. 6,684,962 to Lewallen and U.S. Pat. No. 6,761,228 to Dobson et al. The Lewallen and Dobson implements provide a three section implement when in the field working position, with a center section, and rigid right and left wing sections pivotable up and down with respect to the center section. In order to reduce the transport height however, instead of simply raising the wing sections to an upright orientation, each wing section folds for transport. As result, the Lewallen implement in transport has a five section transport configuration similar to that of the Jeffrey et al., while the Dobson implement has a five section transport configuration similar to that of Noonan et al. and Smith.

In the field position, the outer and inner wings of Lewallen and Dobson are locked together by linkage mechanisms such that they act as a single wing. The linkages are configured such that reduced force is required to be exerted by the hydraulic transport cylinders in order to maintain the inner and outer wings in alignment.

Implements wider than 64 feet are known where the implement is folded horizontally rearward or forward such that the wing sections trail behind or ahead of the center section, however such alternate configurations have their own design problems. For example it is typically required to pivot the rear end of the implement upward before pivoting the wings rearward or forward. Maneuvering the lengthy implement, and attaching air seeder carts and the like are problematic as well with such a departure from typical vertical wing lift designs.

SUMMARY OF THE INVENTION

It is an object of the present invention to provide a system for folding agricultural and like implements for transport that overcomes problems in the prior art.

The present invention provides, in a first embodiment, an agricultural implement apparatus movable from a field position to a transport position. The apparatus comprises a center section, right and left inner foldable wings, right and left outer foldable wings, and right and left foldable wing extensions oriented substantially horizontally when in the field position. When in the transport position, the center section is oriented substantially horizontally; the right and left inner wings extend substantially vertically from right and left ends of the center section; the right and left outer wings extend downward and inward from upper ends of the right and left inner wings such that lower ends of the right and left outer wings are adjacent to each other; and the right and left wing extensions extend downward and outward from the lower ends of the right and left outer wings toward corresponding right and left ends of the center section.

The present invention provides, in a second embodiment, an agricultural implement apparatus supported on wheels for movement along the ground in an operating travel direction. The apparatus comprises a center section, and an inner wing pivotally attached at an inner end thereof to one end of the center section about an inner wing axis oriented substantially horizontally and in alignment with the operating travel direction. An outer wing is pivotally attached at an inner end thereof to an outer end of the inner wing about an outer wing axis oriented substantially parallel to the inner wing axis, and a wing extension is pivotally attached at an inner end thereof to an outer end of the outer wing about a wing extension axis oriented substantially parallel to the inner wing axis. The apparatus is movable from a field position, where the center section inner wing, outer wing, and wing extension are oriented substantially horizontally, to a folded transport position. The apparatus is moved to the folded transport position by pivoting the wing extension upward about the wing extension axis, and by pivoting the outer wing upward about the outer wing axis to a position extending upward and inward over the inner wing such that the wing extension axis is located above a mid-portion of the inner wing, and the wing extension extends substantially toward the inner pivot axis such that the wing extension, outer wing, and inner wing form a triangle configuration. The inner wing is then pivoted upward about the inner wing axis to an upright orientation wherein an apex of the triangle configuration is above a central portion of the center section.

The present invention provides, in a third embodiment, a wing locking and folding apparatus operative to maintain an implement wing extension in alignment with an implement wing when in a field position, and operative to fold the wing extension upward to a transport position. The apparatus comprises an inner link pivotally attached at an inner end thereof to the wing at a first pivot location above a wing frame. An outer link is pivotally attached at an outer end thereof to the wing extension above a wing extension frame at a second pivot location below the first pivot location, and pivotally attached at an inner end thereof to an outer end of the inner link at a third pivot location below the second pivot location. An extendable transport hydraulic cylinder is pivotally attached at an inner end thereof to the outer wing at a fourth pivot location above the first pivot location, and is pivotally attached to the inner link at a fifth pivot location above the first pivot location. A stop is mounted on the wing below the inner link such that when in the field position, the inner link rests on the stop. The outer link has a length that is adjustable, and the alignment of the wing and wing extension is maintained by orienting the stop and the outer link such that an upward force on the wing extension transmits a force through the outer link to urge the inner link downward against the stop, and such that the wing extension and wing are maintained in alignment against an upward force on the wing extension without exerting a force on the transport hydraulic cylinder.

The triangular configuration of the folded wing extensions and outer wings uses more of the available space between the upright inner wings to accommodate a longer length of implement in the space. The wing locking and folding apparatus over-centers to maintain the alignment of the wing extension and wing against an upward force on the wing extension without requiring any force to be exerted by the transport actuator.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
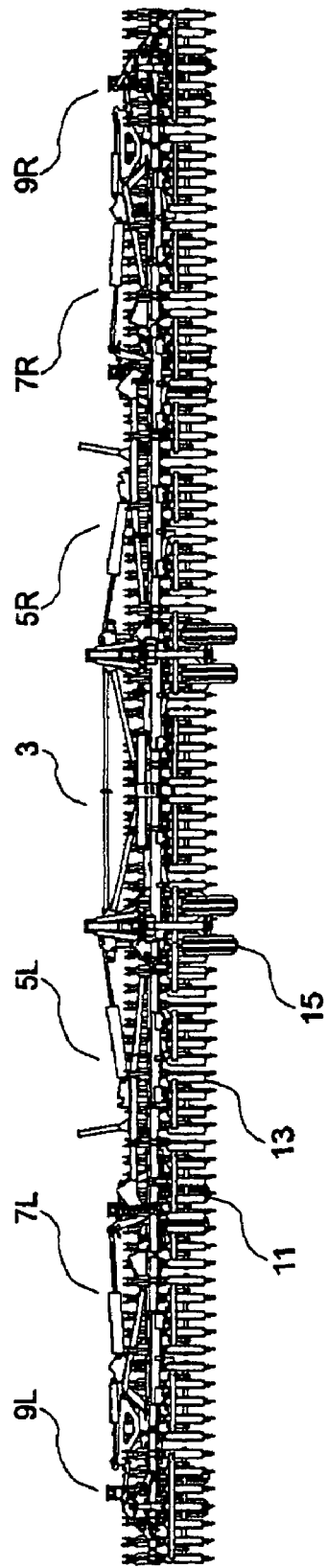
FIG. 1 is a rear view of an embodiment of an agricultural implement apparatus of the invention with all wings in the field position.
Figure 2:
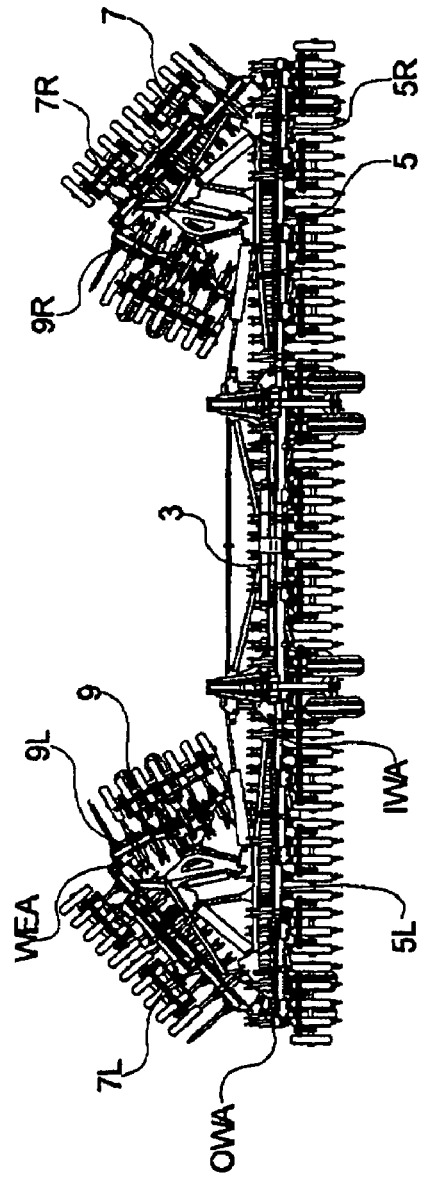
FIG. 2 is rear view of the embodiment of FIG. 1 with the wing extensions and outer wings folded to their transport positions.
Figure 3:
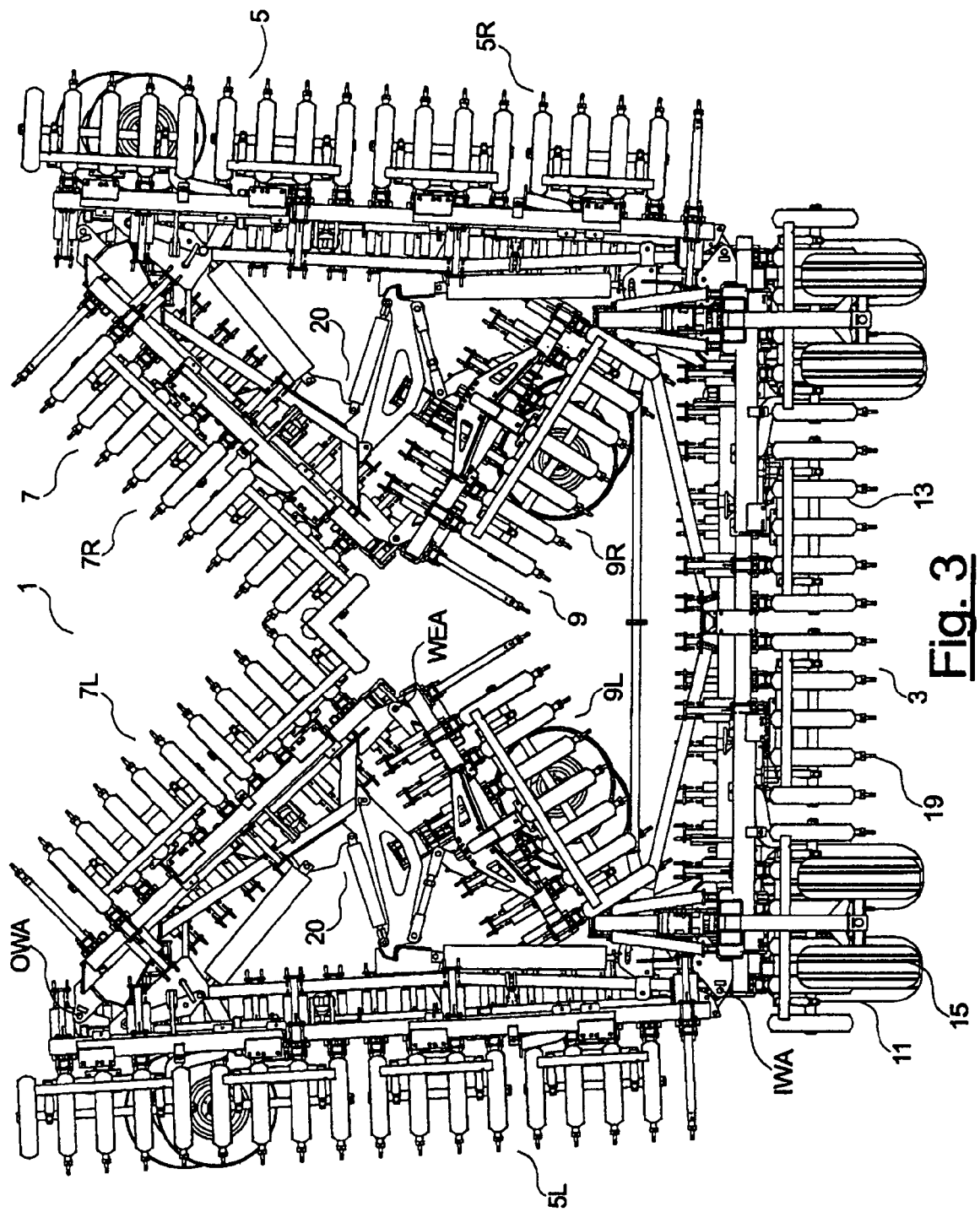
FIG. 3 is rear view of the embodiment of FIG. 1 in the transport position.
Figure 4:
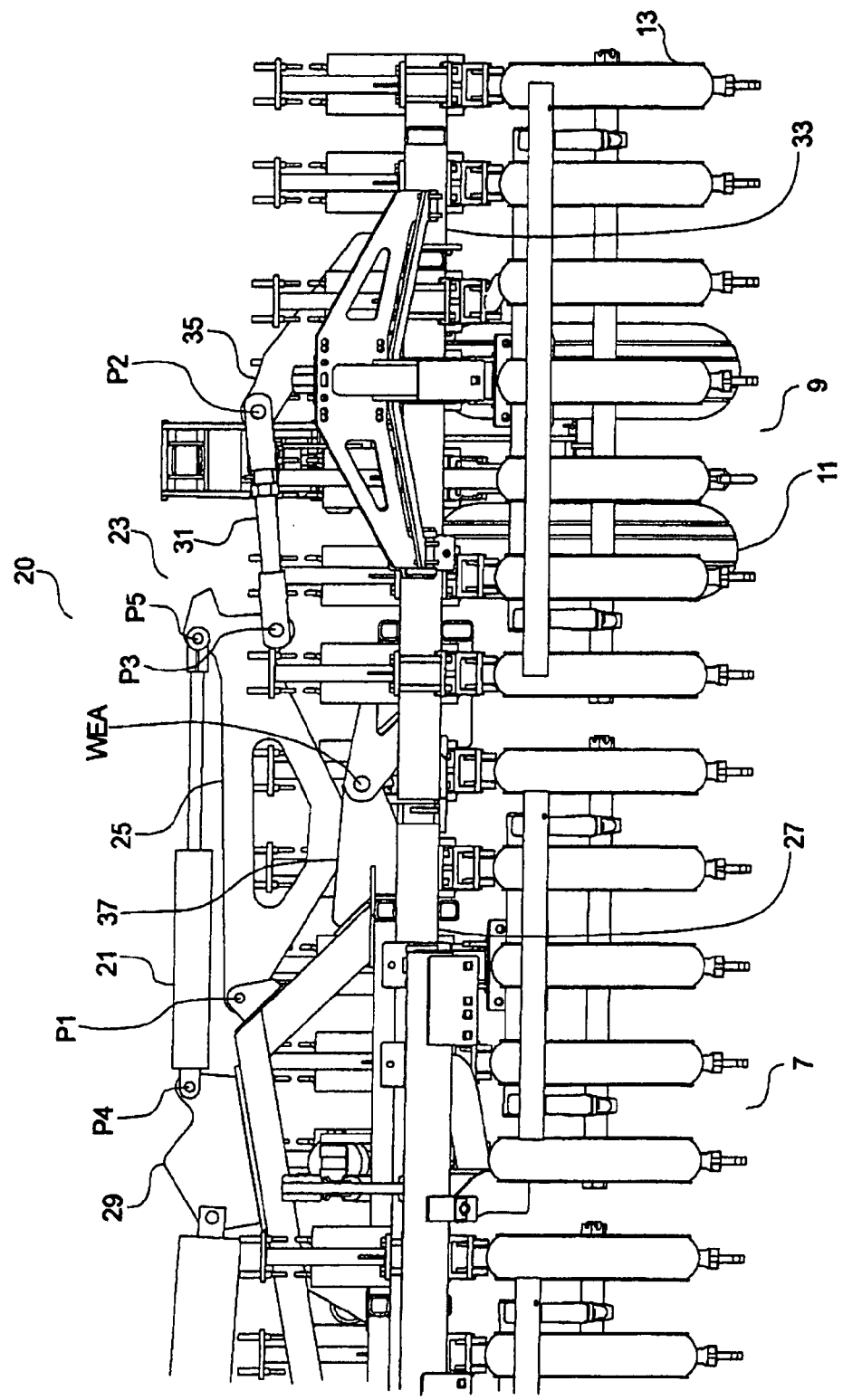
FIG. 4 is a rear view of the wing locking and folding apparatus of the embodiment of FIG. 1 with the outer wing and wing extension in the field position.

FIGS. 1-3 illustrate an agricultural implement apparatus 1 of the present invention movable from a field position illustrated in FIG. 1 to a transport position illustrated in FIG. 3. The apparatus 1 comprises a center section 3, right and left inner foldable wings 5R, 5L, right and left outer foldable wings 7R, 7L, and right and left foldable wing extensions 9R, 9L oriented substantially horizontally when in the field position illustrated in FIG. 1.

In the transport position illustrated in FIG. 3, the center section 3 is oriented substantially horizontally; the right and left inner wings 5R, 5L extend substantially vertically from right and left ends of the center section 3; the right and left outer wings 7R, 7L extend downward and inward from upper ends of the right and left inner wings 5R, 5L such that lower ends of the right and left outer wings 7R, 7L are adjacent to each other; and the right and left wing extensions 9R, 9L extend downward and outward from the lower ends of the right and left outer wings 7R, 7L toward corresponding to right and left ends of the center section 3 such that in the illustrated embodiment lower ends of right and left outer wings 7R, 7L are located above and in proximity to right and left ends of the center section 3.

The illustrated implement apparatus 1 provides a compact transport configuration by orienting the wing extensions 9 and outer wings 7 in a triangular configuration above the inner wings 5, as illustrated in FIG. 2. The geometry is such that a greater length of implement is accommodated between the upright inner wings 5R, 5L when in the transport position of FIG. 3. The triangular configuration utilizes more of the room between the upright inner wings 5R, 5L than in prior art implements. The illustrated embodiment also retains a desirable symmetry between right and left portions of the implement apparatus 1.

Figure 5:
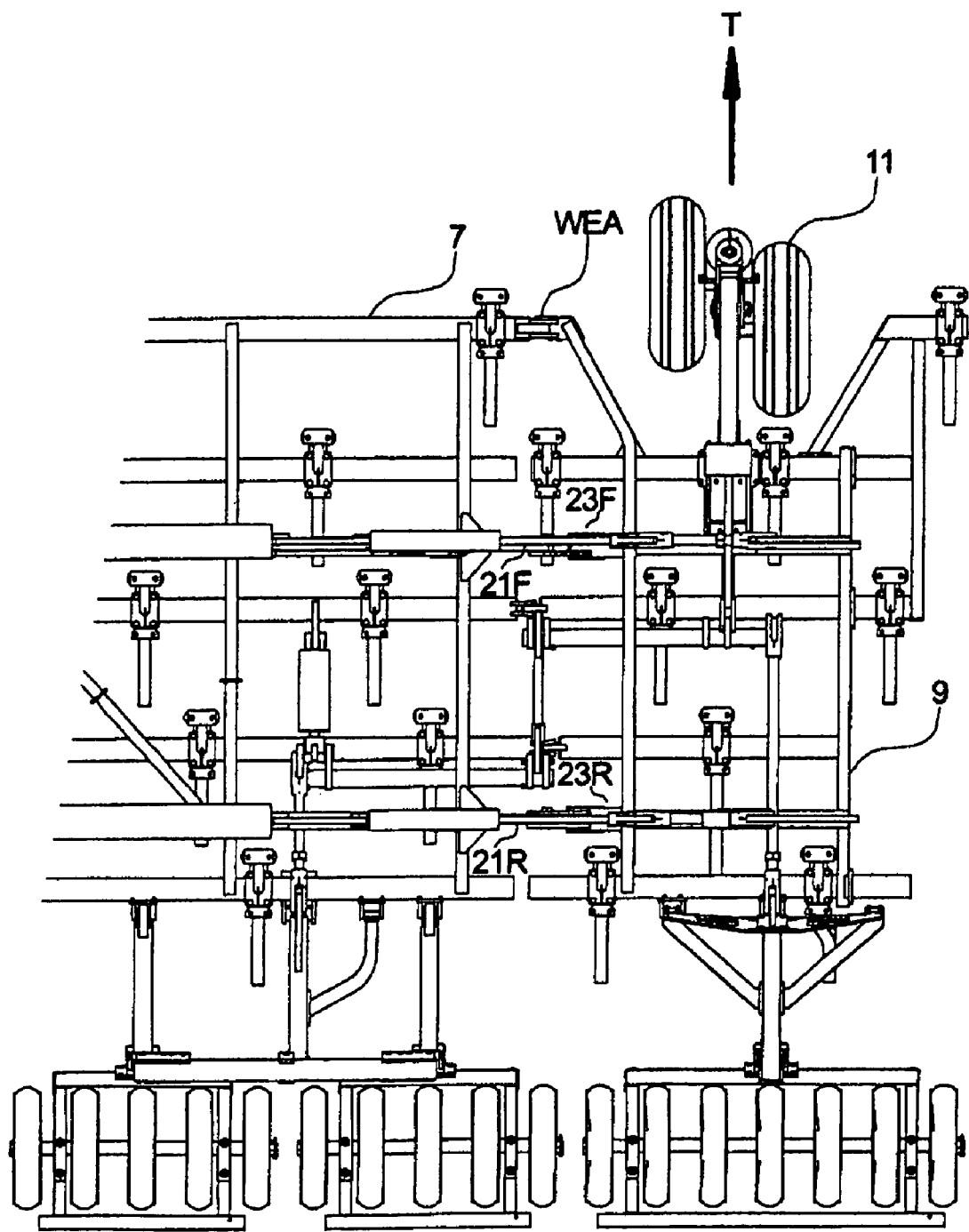
FIG. 5 is a top view of the wing locking and folding apparatus of FIG. 4 with the outer wing and wing extension in the field position.
Figure 6:
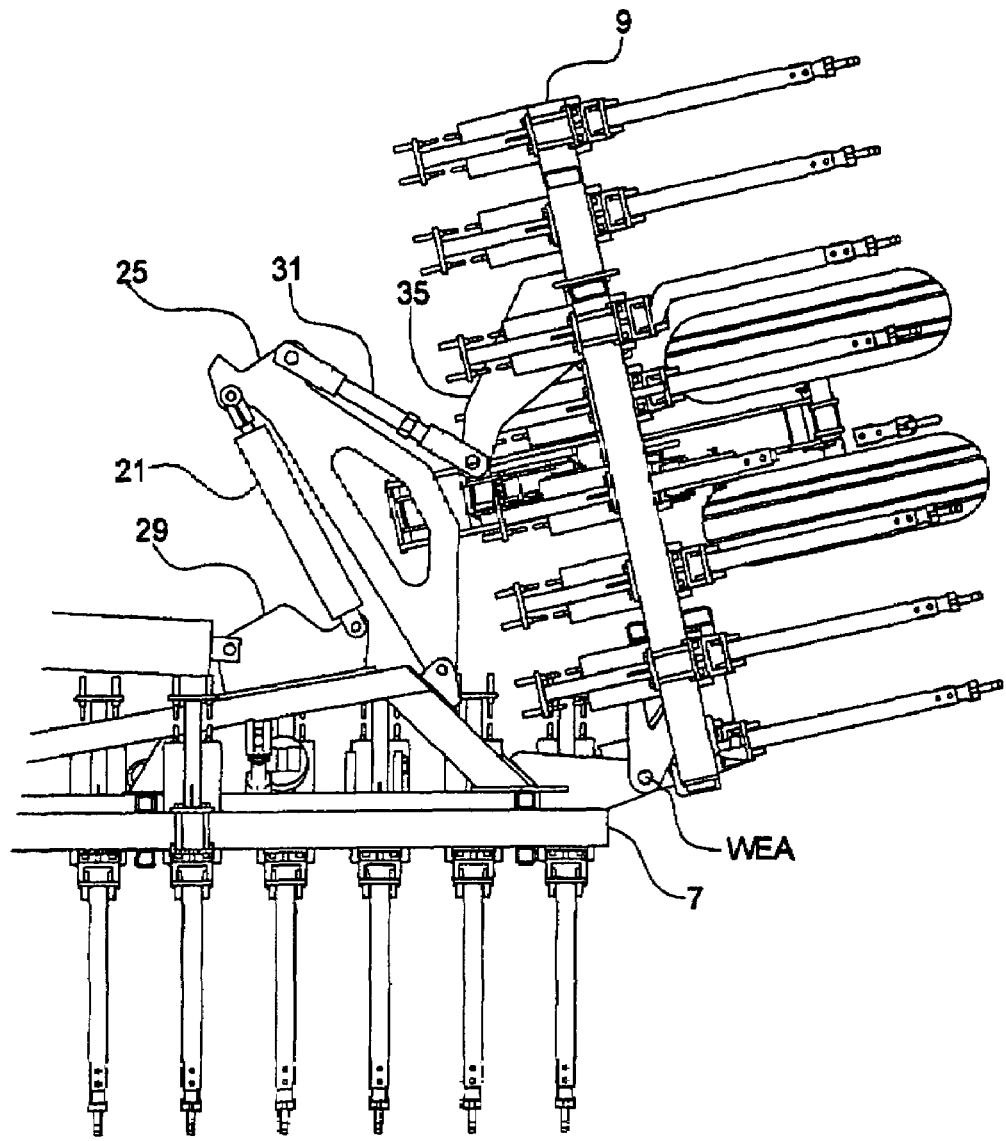
FIG. 6 is a rear view of the wing locking and folding apparatus of FIG. 4 with the wing extension raised to its transport position.
Figure 8:
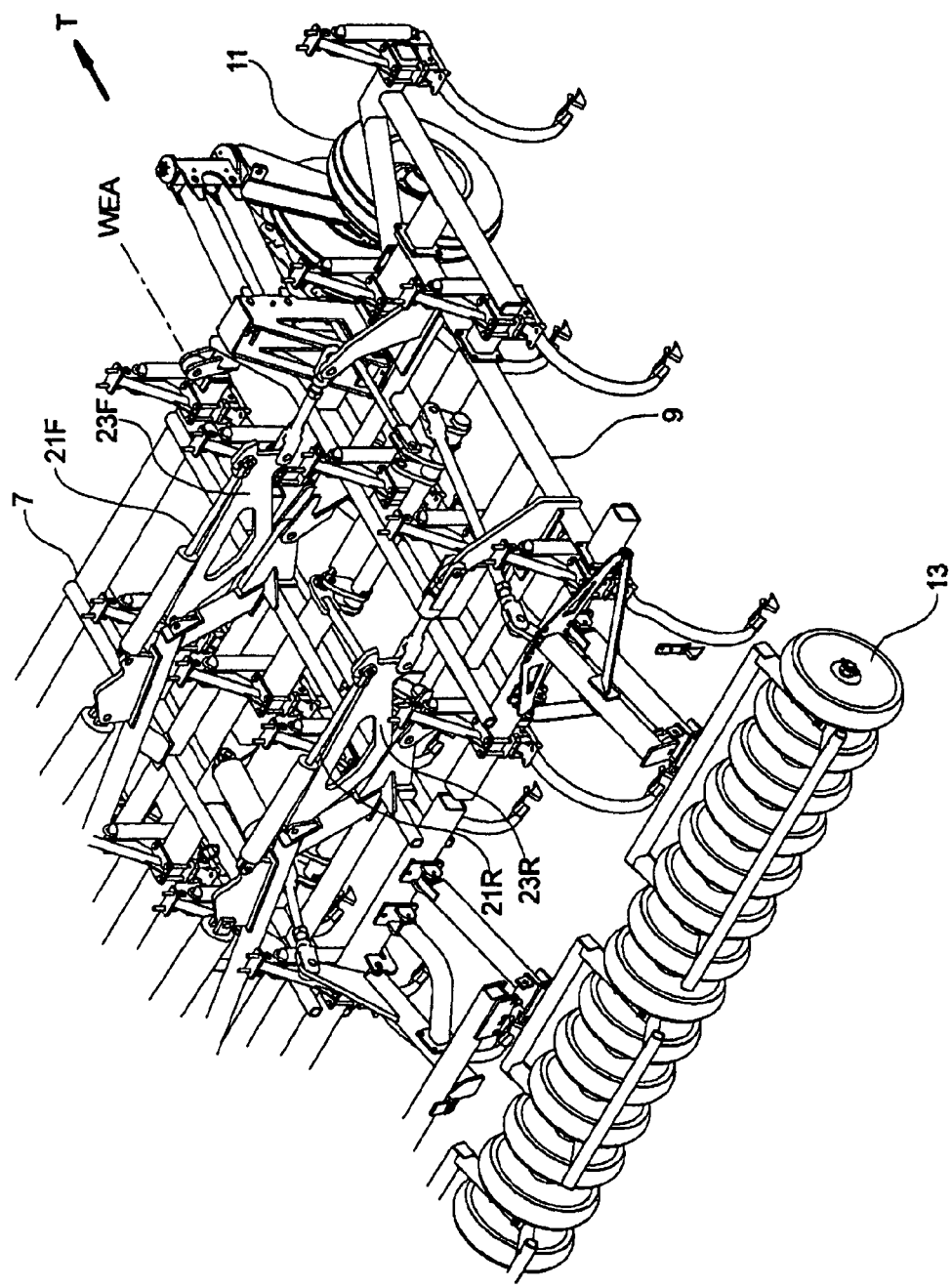
FIG. 8 is a perspective view of the wing locking and folding apparatus of FIG. 4 with the outer wing and wing extension in the field position.

The illustrated air drill implement apparatus 1 is supported on front wheels 11 and packer wheels 13 for movement along the ground in the field position in an operating travel direction T, which direction is indicated in FIGS. 5 and 8. In the transport position the center section 3 is supported on front wheels 11 and rear transport wheels 15.

The inner wings 5 are pivotally attached at inner ends thereof to corresponding right and left ends of the center section 3 about inner wing axes IWA oriented substantially horizontally and in alignment with the operating travel direction. The outer wings 7 are pivotally attached at inner ends thereof to outer ends of the corresponding inner wings 5 about outer wing axes OWA oriented substantially parallel to the inner wing axes IWA. The wing extensions 9 are pivotally attached at inner ends thereof to outer ends of the corresponding outer wings 7 about wing extension axes WEA oriented substantially parallel to the inner wing axes IWA.

The apparatus 1 is moved to the folded transport position by pivoting the wing extensions 9 upward about the wing extension axes WEA, and by pivoting the outer wings 7 upward about the outer wing axis OWA to a position, as illustrated in FIG. 2, extending upward and inward over the inner wings 5 such that each wing extension axis WEA is located above a mid-portion of the corresponding inner wing 5 and the wing extensions 9 extend generally toward the inner pivot axis IWA. The wing extensions 9, outer wings 7, and inner wings 5 thus form right and left triangle configurations as illustrated in FIG. 2. The inner wings 5 are then pivoted upward about the inner wing axis IWA to an upright orientation wherein an apex of each triangle configuration is above a central portion of the center section 3 and the apexes are adjacent to each other, and the apparatus 1 is then in the transport position illustrated in FIG. 3.

While embodiments are contemplated wherein each wing and wing extension 5, 7, 9 can pivot independently in the field position with respect to the next, providing a seven section implement when in the field position, in the illustrated embodiment the wing extensions 9 and outer wings 7 are locked into alignment by a wing locking and folding apparatus 20 when in the field position such that pivotal movement about the wing extension axis WEA is prevented. When in the field position then, the apparatus 1 provides a five section implement that is contemplated to be satisfactory for field conditions such as normally encountered.

The illustrated implement is an air drill, and the five field working sections comprise twenty furrow openers 19 on the center section 3, seventeen furrow openers on each inner wing 5, and eighteen furrow openers on each combination of the outer wing 7 (ten furrow openers) and wing extension 9 (eight furrow openers). The furrow openers 19 are thus fairly evenly distributed between each working section of the implement apparatus 1 as is desirable to provide consistency in operation across the width of the implement. The illustrated implement apparatus 1 has ninety furrow openers on ten inch spacings, for a working implement width of 75 feet. In the folded transport position of FIG. 3 the implement has a height of 18 feet, 11 inches and a width of 23 feet, 7 inches, which dimensions are within the desired maximum height and width ranges for transport.

FIGS. 4-8 illustrate the wing locking and folding apparatus 20 used to maintain the wing extension 9 and outer wing 7 in alignment in the field position. The wing locking and folding apparatus 20 comprises an extendable transport actuator 21 and a lock mechanism 23. The extendable transport actuator 21 is illustrated as a hydraulic cylinder operated by fluid pressure from the implement towing tractor, and is pivotally attached at an inner end thereof to the outer wing 7 and pivotally attached at an outer end thereof to the lock mechanism 23 connected to the wing extension 9. The transport hydraulic cylinder 21 is operative to pivot the wing extension 9 upward about the wing extension axis WEA to the transport position illustrated in FIG. 6, and is operative to pivot the wing extension 9 downward about the wing extension axis WEA to the field position illustrated in FIG. 4. The lock mechanism 23 is operative to lock the wing extension 9 and outer wing 7 into alignment when in the field position.

The illustrated lock mechanism 23 is an over-centering lock mechanism configured such that, when in the field position, the wing extension 9 and outer wing 7 are maintained in alignment by the over-centering lock mechanism 23 such that an upward force on the wing extension 9 exerts no force on the transport hydraulic cylinder 21. The lock mechanism 23 comprises an inner link 25 pivotally attached at an inner end thereof to the outer wing 7 at a first pivot location P1 above the wing frame 27. An outer wing bracket 29 is attached to the wing frame 27 to provide an elevated location for attachment of the transport hydraulic cylinder 21 and inner link 25. An outer link 31 is pivotally attached at an outer end thereof to the wing extension frame 33 at a second pivot location P2, and is pivotally attached at an inner end thereof to an outer end of the inner link 25 at a third pivot location P3 located below a line L joining the first and second pivot locations P1, P2. A wing extension bracket 35 is attached to the wing extension frame 33 to provide an elevated location for attachment of the outer link 31.

The transport hydraulic cylinder 21 is operative to raise the wing extension 9 with respect to the outer wing 7 about the wing extension axis WEA when the transport hydraulic cylinder 21 is retracted. In the illustrated embodiment of FIG. 4 the transport hydraulic cylinder 21 is pivotally attached at an inner end thereof to the outer wing bracket 29 at a fourth pivot location P4 above the first pivot location P1, and is pivotally attached to the inner link 25 at a fifth pivot location P5 above the first pivot location P1. A stop 37 is mounted on the outer wing 7 below the inner link 25 such that when in the field position, the inner link 25 rests on the stop 37.

With pivot locations oriented as described above, the outer link 31 is oriented sloping downward from the outer end to the inner end. The outer link 31 has a length that is adjustable, and the alignment of the outer wing 7 and wing extension 9 is maintained by orienting the stop 37 and the outer link 31 such that an upward force on the wing extension 9 transmits a force through the outer link 31 to urge the inner link 25 downward against the stop 37. Some alignment adjustments could also be accomplished by adjusting the location of the top of the stop 37.

Figure 7:
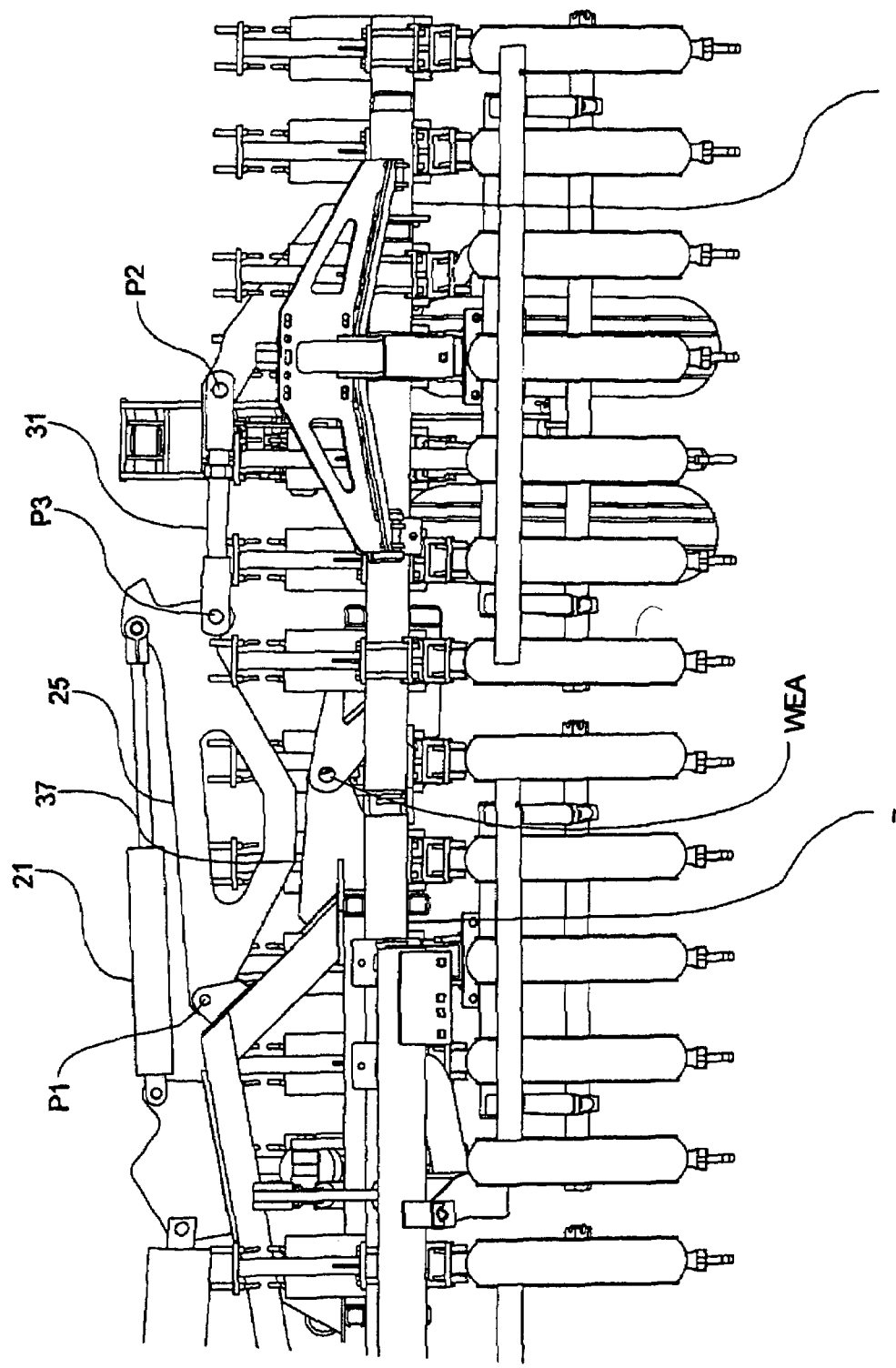
FIG. 7 is a rear view of the wing locking and folding apparatus of FIG. 4 with the wing extension raised to the point where the locking mechanism over-centers.

FIG. 7 illustrates the wing extension 9 at the point of over-centering where the outer link 31 is substantially horizontal and the pivot locations P1, P2, and P3 are aligned. At this position it can be seen that the bottom of the inner link 25 is slightly above the stop 37. When the bottom of the inner link 25 moves down into contact with the stop 37, the pivot location P3 moves below the line between pivot locations P1 and P2 and the outer link 31 is oriented downward from the outer end at P2 to the inner end at P3. Upward force on the wing extension 9 will then exert a downward force on the inner link 25.

In the illustrated embodiment, there is at substantially all times an upward force on the wing extension because while rear packer wheels 13 support a rear end of the outer wing, there is no front wheel 11 on the outer wing 7, but only on the wing extension 9. The front portion of the outer wing 7 is thus supported by the front wheel 11 on the wing extension 9 when in the field position. In implements such as cultivators which have no packer wheels, the outer wing will have no wheels at all mounted thereon, and will be totally supported by wheels on the wing extension. In such an implement, there will be substantially only an upward force on the wing extension, since ground engaging tools on the outer wing will tend to draw the outer wing into the ground, and this movement will be resisted by the wheel exerting an upward force on the wing extension.

As illustrated in FIGS. 5 and 8, in order to more securely fix the wing extension 9 in alignment with the outer wing 7, the illustrated embodiment comprises front and rear transport actuators 21F, 21R and corresponding front and rear locking mechanisms 23F, 23R. The implement apparatus 1 provides a compact transport position for an agricultural implement. An over-centering wing lock mechanism 23 is provided that removes force on the transport hydraulic cylinder 21 due to upward forces on the wing extension 9.

Figure 9:
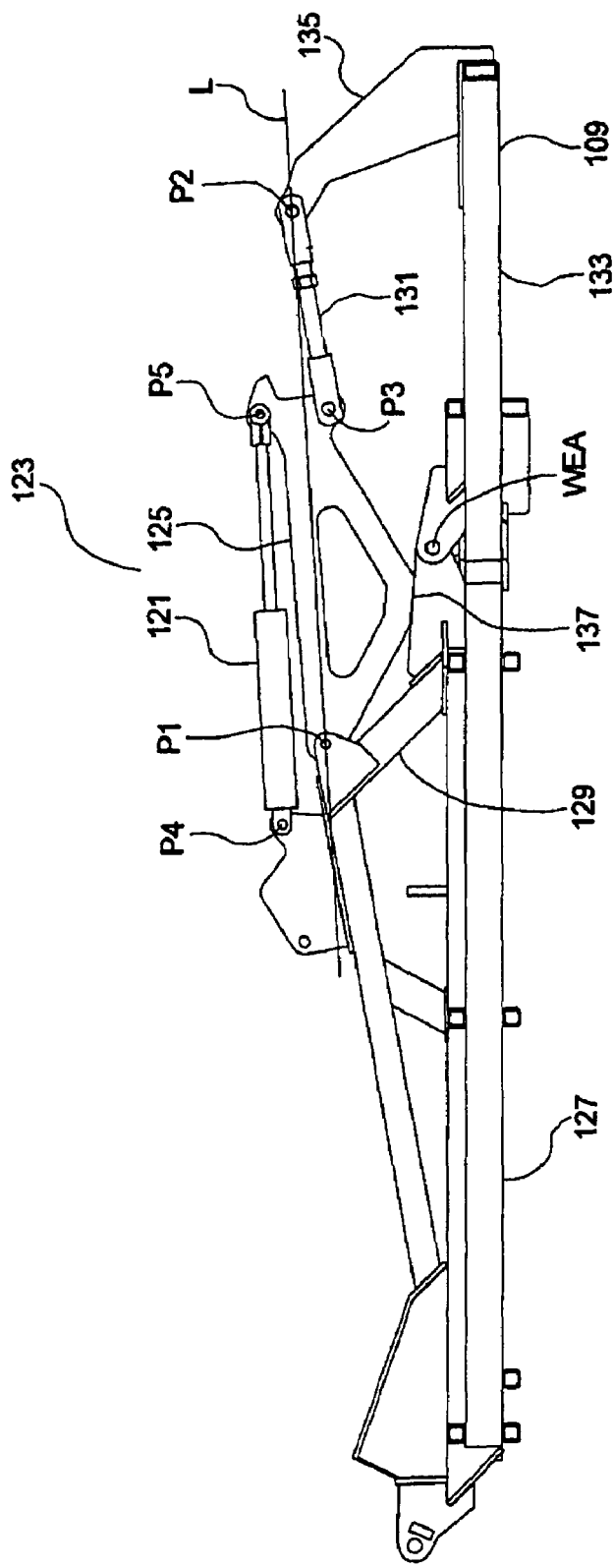
FIGS. 9-11 illustrate alternate embodiments of the wing locking and folding apparatus of the invention.
Figure 10:
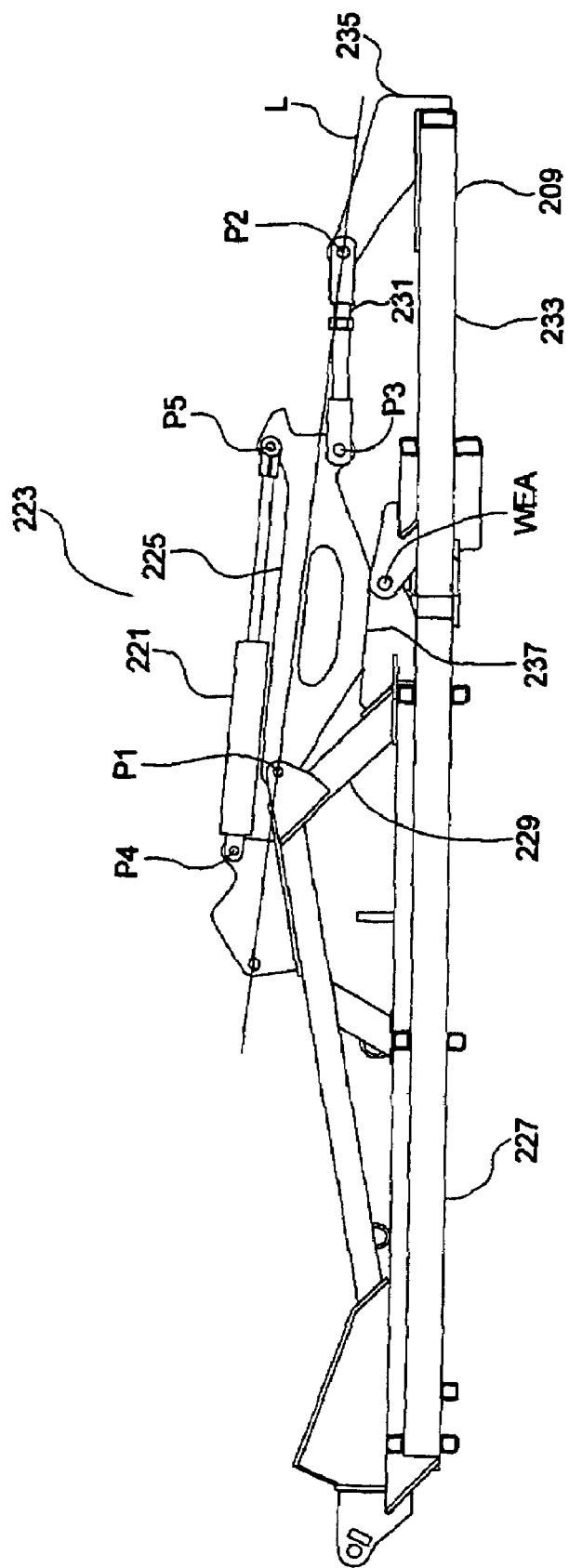
Figure 11:
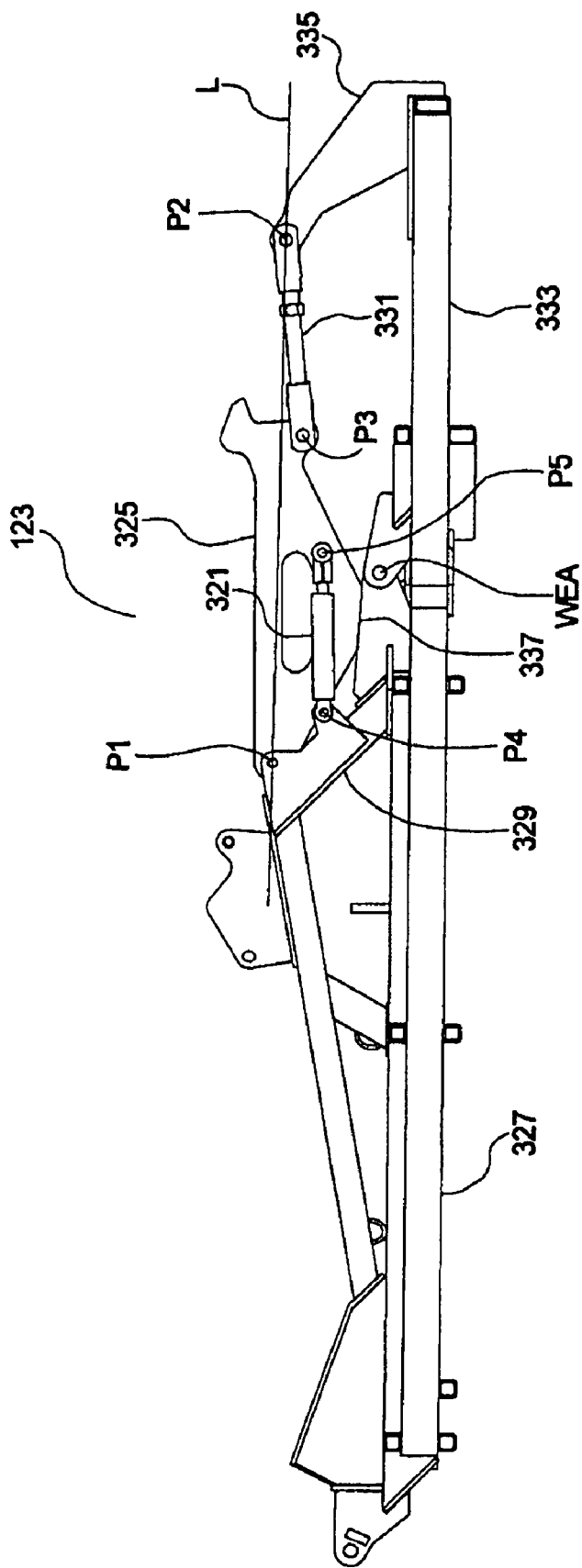

Further alternate configurations of the locking mechanism are illustrated in FIGS. 9-11. FIG. 9 schematically illustrates an alternate over-centering lock mechanism 123 comprising an inner link 125 pivotally attached at an inner end thereof to the outer wing at a first pivot location P1 above the wing frame 127 on outer wing bracket 129. Outer link 131 is pivotally attached at an outer end thereof to the wing extension above the wing extension frame 133 to wing extension bracket 135 at a second pivot location P2, and is pivotally attached at an inner end thereof to an outer end of the inner link 125 at a third pivot location P3 located below the line L joining the first and second pivot locations P1, P2. The transport hydraulic cylinder 121 is pivotally attached at an inner end thereof to the outer wing bracket 129 at a fourth pivot location P4 above the first pivot location P1, and is pivotally attached to the inner link 125 at a fifth pivot location P5 above the first pivot location P1. The transport hydraulic cylinder 121 is retracted to pivot the wing extension 109 upward about the wing extension axis WEA. The stop 137 is mounted on the wing frame 127 below the inner link 125 such that when in the field position, the inner link 125 rests on the stop 137.

FIG. 10 schematically illustrates an alternate over-centering lock mechanism 223 comprising an inner link 225 pivotally attached at an inner end thereof to the outer wing at a first pivot location P1 above the wing frame 227 on outer wing bracket 229. Outer link 231 is pivotally attached at an outer end thereof to the wing extension above the wing extension frame 233 to wing extension bracket 235 at a second pivot location P2, and is pivotally attached at an inner end thereof to an outer end of the inner link 225 at a third pivot location P3 located below the line L joining the first and second pivot locations P1, P2. The transport hydraulic cylinder 221 is pivotally attached at an inner end thereof to the outer wing bracket 229 at a fourth pivot location P4 above the first pivot location P1, and is pivotally attached to the inner link 225 at a fifth pivot location P5 above the first pivot location P1. The transport hydraulic cylinder 221 is retracted to pivot the wing extension 209 upward about the wing extension axis WEA. The stop 237 is mounted on the wing frame 227 below the inner link 225 such that when in the field position, the inner link 225 rests on the stop 237.

FIG. 11 schematically illustrates a further alternate over-centering lock mechanism where the transport hydraulic cylinder 321 is extended to pivot the wing extension upward about the wing extension axis WEA. The lock mechanism comprises an inner link 325 pivotally attached at an inner end thereof to the outer wing at a first pivot location P1 above the wing frame 327 on outer wing bracket 329. Outer link 331 is pivotally attached at an outer end thereof to the wing extension above the wing extension frame 333 to wing extension bracket 335 at a second pivot location P2, and is pivotally attached at an inner end thereof to an outer end of the inner link 325 at a third pivot location P3 located below the line L joining the first and second pivot locations P1, P2. The transport hydraulic cylinder 321 is pivotally attached at an inner end thereof to the outer wing bracket 329 at a fourth pivot location P4 below the first pivot location P1, and is pivotally attached to the inner link 325 at a fifth pivot location P5 below the first pivot location P1. The stop 337 is mounted on the wing frame 327 below the inner link 325 such that when in the field position, the inner link 325 rests on the stop 337.

The inner and outer links, stop, and transport hydraulic cylinder can thus be oriented in a multitude of ways. The over-centering lock mechanism comprises inner and outer links that over center in the field position. One or the other of them hits a stop when in the field position, and one or the other of them is driven by the transport hydraulic cylinder. Either one of the links or the stop can be made adjustable to align the wing and wing extension, and the location of the transport hydraulic cylinder, which link it drives, and whether it pulls or pushes is widely variable.

Thus the foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An agricultural implement apparatus supported on wheels for movement along the ground in an operating travel direction, the apparatus comprising:

a center section;

an inner wing pivotally attached at an inner end thereof to one end of the center section about an inner wing axis oriented substantially horizontally and in alignment with the operating travel direction;

an outer wing pivotally attached at an inner end thereof to an outer end of the inner wing about an outer wing axis oriented substantially parallel to the inner wing axis; and a wing extension pivotally attached at an inner end thereof to an outer end of the outer wing about a wing extension axis oriented substantially parallel to the inner wing axis;

wherein the apparatus is movable from a field position, where the center section inner wing, outer wing, and wing extension are oriented substantially horizontally, to a folded transport position; and wherein the apparatus is moved to the folded transport position by pivoting the wing extension upward about the wing extension axis, and by pivoting the outer wing upward about the outer wing axis to a position extending upward and inward over the inner wing such that the wing extension axis is located above a mid-portion of the inner wing, and the wing extension extends substantially toward the inner wing axis such that the wing extension, outer wing, and inner wing form a triangle configuration, and by then pivoting the inner wing upward about the inner wing axis to an upright orientation wherein an apex of the triangle configuration is above a central portion of the center section;

wherein the wing extension and outer wing are locked into alignment when in the field position such that pivotal movement about the wing extension axis is substantially prevented;

an extendable transport actuator pivotally attached at an inner end thereof to the outer wing and pivotally attached at an outer end thereof to a lock mechanism connected to the wing extension, and wherein the transport actuator is operative to pivot the wing extension upward about the wing extension axis to the transport position, and is operative to pivot the wing extension downward about the wing extension axis to the field position, and wherein the lock mechanism is operative to lock the wing extension and outer wing into alignment such that when in the field position the wing extension and outer wing are maintained in alignment;

wherein the lock mechanism is an over-centering lock mechanism configured such that when in the field position the wing extension and outer wing are maintained in alignment by the over-centering lock mechanism such that an upward force on the wing extension exerts no force on the transport actuator;

wherein the lock mechanism comprises an inner link pivotally attached at an inner end thereof to the outer wing at a first pivot location above a wing frame; an outer link pivotally attached at an outer end thereof to the wing extension above a wing extension frame at a second pivot location below the first pivot location, and pivotally attached at an inner end thereof to an outer end of the inner link at a third pivot location below the second pivot location; and a stop mounted on the outer wing below the inner link such that when in the field position, the inner link rests on the stop; and wherein the transport actuator is pivotally attached at an inner end thereof to the outer wing at a fourth pivot location above the first pivot location, and is pivotally attached to the inner link at a fifth pivot location above the first pivot location.

2. The apparatus of claim 1 comprising at least one extension wheel mounted on the wing extension and wherein the outer wing is supported by the at least one extension wheel on the wing extension when in the field position.

3. The apparatus of claim 2 wherein the outer link has a length that is adjustable, and wherein the alignment of the outer wing and wing extension is maintained by orienting the stop and the outer link such that an upward force on the wing extension transmits a force through the outer link to urge the inner link downward against the stop.

4. The apparatus of claim 3 wherein a location of the stop is adjustable.

5. A wing locking and folding apparatus operative to maintain an implement wing extension in alignment with an implement wing when in a field position, and operative to fold the wing extension upward to a transport position, the apparatus comprising:

an inner link pivotally attached at an inner end thereof to the wing at a first pivot location above a wing frame;

an outer link pivotally attached at an outer end thereof to the wing extension above a wing extension frame at a second pivot location, and pivotally attached at an inner end thereof to an outer end of the inner link at a third pivot location;

wherein when the wing extension is in the field position, the third pivot location is below a line joining the first and second pivot locations;

a stop mounted such that when in the field position, one of the inner link and the outer link rests on the stop;

an extendable transport hydraulic cylinder pivotally attached at a first end thereof to one of the wing and the wing extension and pivotally attached at a second end thereof to one of the inner link and the outer link and operative to move the wing extension from the field position upward to a raised transport position;

wherein the alignment of the wing and wing extension in the field position is maintained by configuring the stop such that an upward force on the wing extension transmits a force through the outer link downward against the stop such that upward movement of the wing extension with respect to the wing is prevented.

6. The apparatus of claim 5 wherein at least one of the stop, the inner link, and the outer link is adjustable.

7. The apparatus of claim 5 wherein the extendable transport hydraulic cylinder is pivotally attached at an inner end thereof to the wing at a fourth pivot location above the first pivot location, and is pivotally attached to the inner link at a fifth pivot location above the first pivot location, and wherein the transport hydraulic cylinder is retracted to move the inner link upward from the field position to the transport position.

8. The apparatus of claim 5 wherein the extendable transport hydraulic cylinder is pivotally attached at an inner end thereof to the wing at a fourth pivot location below the first pivot location, and is pivotally attached to the inner link at a fifth pivot location below the first pivot location, and wherein the transport hydraulic cylinder is extended to move the inner link upward from the field position to the transport position.

9. The apparatus of claim 5 wherein the wing and wing extension are configured with at least one extension wheel mounted on the wing extension and no wheels mounted on the wing, such that the wing is supported by the at least one extension wheel on the wing extension.

* * * * *